United States Patent [19]

De Martine et al.

[11] Patent Number: 5,619,675

[45] Date of Patent: Apr. 8, 1997

[54] METHOD AND APPARATUS FOR CACHE MEMORY MANAGEMENT USING A TWO LEVEL SCHEME INCLUDING A BIT MAPPED CACHE BUFFER HISTORY TABLE AND CIRCULAR CACHE BUFFER LIST

[75] Inventors: Patrick A. L. De Martine, Littleton; Michael S. Milillo, Louisville, both of Colo.

[73] Assignee: Storage Technology Corporation, Louisville, Colo.

[21] Appl. No.: 650,661

[22] Filed: May 20, 1996

Related U.S. Application Data

[63] Continuation of Ser. No. 259,506, Jun. 14, 1994, abandoned.

[51] Int. Cl.⁶ .................................................. G06F 12/16
[52] U.S. Cl. .................... 395/460; 395/461; 395/463; 395/486; 395/487
[58] Field of Search ........................... 395/460, 461, 395/462, 463, 486, 487

[56] References Cited

U.S. PATENT DOCUMENTS

| | | | |
|---|---|---|---|
| 4,168,541 | 9/1979 | DeKarske | 365/49 |
| 4,740,914 | 4/1988 | Abrant et al. | 395/410 |
| 4,802,086 | 1/1989 | Gay et al. | 395/460 |
| 4,803,654 | 2/1989 | Rasberry et al. | 395/250 |
| 4,967,353 | 10/1990 | Brenner et al. | 395/487 |
| 5,043,870 | 8/1991 | Ditzel et al. | 395/459 |
| 5,043,885 | 8/1991 | Robinson | 35/460 |
| 5,133,060 | 7/1992 | Weber et al. | 395/440 |
| 5,285,527 | 2/1994 | Crick et al. | 395/445 |
| 5,347,642 | 9/1994 | Barratt | 395/440 |
| 5,381,528 | 1/1995 | Brunelle | 395/250 |
| 5,381,539 | 1/1995 | Yanai et al. | 395/460 |
| 5,386,562 | 1/1995 | Jain et al. | 395/650 |
| 5,423,017 | 6/1995 | Parikh | 395/494 |
| 5,432,917 | 7/1995 | Parikh | 395/487 |
| 5,444,853 | 8/1995 | Lentz | 395/250 |
| 5,493,663 | 2/1996 | Parikh | 395/486 |

OTHER PUBLICATIONS

R. Karedla et al., "Caching Strategies to Improve Disk System Performance", Mar. 1994, vol. 27 Issue 3, Computer Magazine, pp. 38–46.

D.L. Willick et al., "Disk Cache Replacement Policies for Network Fileservers", 1993, Distributed Computing Systems, 1993 International Conference, pp. 2–11.

Dosaka et al., A 100–MHz 4Mb Cache DRAM with Fast Copy–Back Scheme, vol. 27, No. 11, Nov. 1992, IEEE Journal of Solid–State Circuits, pp. 1534–1539.

*Primary Examiner*—Eddie P. Chan
*Assistant Examiner*—Hong Kim
*Attorney, Agent, or Firm*—Duft, Graziano & Forest, P.C.

[57] ABSTRACT

The cache buffer management system functions in a mass storage subsystem to locate a less recently referenced cache buffer to be overwritten with new data. The system of the present invention utilizes P in-cache bitmaps (ICBMs) in a history table to indicate that a particular cache buffer, corresponding to each bit of each ICBM, has been referenced during the past P time periods. A cache buffer is "hot" if the corresponding bit in any of the P ICBMs indicates that the cache buffer has been referenced. Otherwise, where all corresponding bits in all P ICBMs are clear, a cache buffer is "cold". In conjunction with the ICBMs, a track reference count list (TRCL) circular list contains the ID of cache buffers in chronological order of their reference. To determine a buffer suitable for overwriting, the cache buffer management system searches backward from oldest toward newest in the TRCL list of references to find a cache buffer which is "cold". The first "cold" cache buffer found is then overwritten with new data. The combination of ICBMs and the TRCL use less overhead space and uses a memory which comprises a fast portion which may be more rapidly accessed than a remaining slow portion.

10 Claims, 13 Drawing Sheets

METHOD AND APPARATUS FOR CACHE MEMORY MANAGEMENT USING A TWO LEVEL SCHEME INCLUDING A BIT MAPPED CACHE BUFFER HISTORY TABLE AND CIRCULAR CACHE BUFFER LIST

This application is a file wrapper continuation of application Ser. No. 08/259,506, filed Jun. 14, 1994, now abandoned

FIELD OF THE INVENTION

The present invention relates to the field of computer mass storage systems and in particular to the methods utilized to manage cache memory subsystems of mass storage systems. More specifically, the present invention relates to methods and apparatus for identifying a cache buffer available to be overwritten with more recently accessed information.

PROBLEM

Mass storage systems are known to provide rapid access to large quantities of data for use in computer systems. Mass storage systems frequently utilize Direct Access Storage Devices for storing data (hereinafter referred to as DASD). DASD use magnetic or optical techniques to record information on a rotating medium by moving read/write electronics radially across the rotating surface. The performance of mass storage systems has been limited by various mechanical aspects of the magnetic or optical storage devices utilized in the mass storage system. The time required to radially position read/write electronics at an appropriate position on the rotating storage medium and the time required for the medium to rotate to the desired location are both large in comparison with the time a host computer system may require to process the information associated with the storage location. This large differential in processing time versus access time to retrieve or record the data, continues to grow as CPU speed increases and multiple host computer systems operating in parallel attempt to access data from a common mass storage system.

It is known to use memory subsystems as a cache buffer to improve the performance of mass storage systems. Computer system applications tend to reference data with significant locality. In other words, a first request for information from a mass storage system tends to be followed by a later request for information stored physically near the location of the first request on the DASD. For example, a sector read from a track of DASD is frequently followed by requests for the next sector in the same track. Cache buffers are used to record the data read from an entire track of DASD containing the requested sector of data. A host computer system request for another sector from the same track is then satisfied by accessing the data from the cache buffer rather than the DASD. Memory subsystems used for cache buffers are typically comprised of semiconductor memory components. There are no mechanical delays associated with retrieving or recording data in semiconductor memory subsystems. This use of cache buffers permits very rapid access by a computer system to data stored physically near a previously accessed piece of data. Various methods have been employed to determine whether the requested data is in the cache buffers, or must be exchanged directly with the DASD. These methods for locating the requested data are beyond the scope of the present invention.

Since the memory subsystem utilized for cache buffers has a smaller capacity than the total capacity of the mass storage system, the memory subsystem is managed by a local CPU which attempts to keep the most recently accessed data in the cache buffers. When the cache buffers are filled, older data in the cache buffers must be discarded to make room for newer, more recently accessed, data to be stored in cache buffers. To make room for new data in the cache buffers, the local CPU of the memory subsystem of prior designs locates the least recently referenced (typically referred to as least recently used or LRU) cache buffer and discards it. New data, more recently referenced is then placed in the vacated cache buffers.

Prior methods used to locate the LRU cache buffer maintain a linked list data structures, one data structure per cache buffer in the memory subsystem. As each cache buffer is referenced by a request from a host computer system, that data structure is unlinked from the linked list in its current position and relinked to the top of the linked list. Over time, these methods migrate the more recently used cache buffers toward the top of the list and the least recently used cache buffers toward the bottom of the list. Some prior methods have maintained a doubly linked list to reduce the processing time required for moving a data structure from its current position in the list to the top of the linked list.

Although these prior methods maintain the linked list in strict order from most to least recently used, they do so at a significant cost in memory overhead for maintenance of the linked list. For each cache buffer in the memory subsystem, the data structure element requires two pointers, one each for the forward and reverse linked lists, and an identifier for the track location contained in the cache buffer. The overhead memory requirements for maintaining this linked list structure grows rapidly in proportion to the capacity of the memory subsystem. Though larger memory subsystems are desirable to enhance the performance of the mass storage system, a significant portion of the total memory is lost to the overhead of linked list maintenance.

SOLUTION

The system of the present invention solves the problems discussed above and thereby advances the art providing a cache memory management system which uses a two level scheme, including a bit mapped cache buffer history table and a circular cache buffer list. This cache memory management system determines which cache buffers are to be overwritten with data, using a two-level cache buffer management process. The methods of the present invention requires less memory than prior methods and therefor may accommodate larger memory subsystem sizes with less wasted overhead.

The present system of the invention does not maintain a strict ordering of cache buffers from most to least recently used but rather maintains information regarding "hot" and "cold" cache buffers. A "hot" buffer is a cache buffer which has been referenced by an attached host computer system during any of the past P periods of time and a "cold" buffer is one which has not been referenced by any attached host computer system during the past P periods of time. For each of the last P periods of time, a block of the memory subsystem is allocated for an "in-cache" bitmap (hereinafter referred to as ICBM). An ICBM uses one bit of memory for each cache buffer allocated in the memory subsystem. During any one period of time, the bit corresponding to each cache buffer is set in an ICBM if the cache buffer is referenced during the current time period. Another ICBM is used at the end of the current period of time (the start of the next period of time). If the bit corresponding to a particular cache buffer is set in any of the P ICBMs, then the cache buffer is "hot", it has been referenced during the past P periods of time, otherwise the buffer is "cold" and may be overwritten with newer, more recently accessed data.

The system of the present invention further includes the use of a track reference count list (hereinafter TRCL) in conjunction with the ICBMs. The TRCL is a circular list of entries which indicate the cache buffers referenced over time. Each time a cache buffer is referenced by a host computer system, the system of the present invention examines the ICBM for the current time period to determine whether the cache buffer has already been referenced during the current time period. No further processing is required of the TRCL if the cache buffer has already been referenced during the current time period. If the cache buffer has not been referenced during the current time period, the ICBM bit for the corresponding cache buffer is set and an index number representing the referenced cache buffer is added to an entry in the TRCL.

When a cache buffer needs to be discarded to make room for new data, the systems of the present invention inspects the TRCL entries starting with the oldest entry in the TRCL circular list. The cache buffer corresponding to the index number stored in the oldest TRCL entry may be discarded if the ICBMs indicate that the corresponding cache buffer has not been referenced in any of the past P time periods, or in other words, the oldest "cold" cache buffer is discarded. Otherwise, the cache buffer is "hot" and may not be overwritten at this time. In this case, the next TRCL entry is processed in the same manner until a cache buffer is found which may be overwritten.

The methods and apparatus of the present invention permit the determination of a cache buffer to be overwritten as do prior designs utilizing LRU linked lists. However, the method and apparatus of the present invention do so utilizing less memory subsystem overhead than do prior designs.

DETAILED DESCRIPTION OF THE INVENTION

Figure 1:
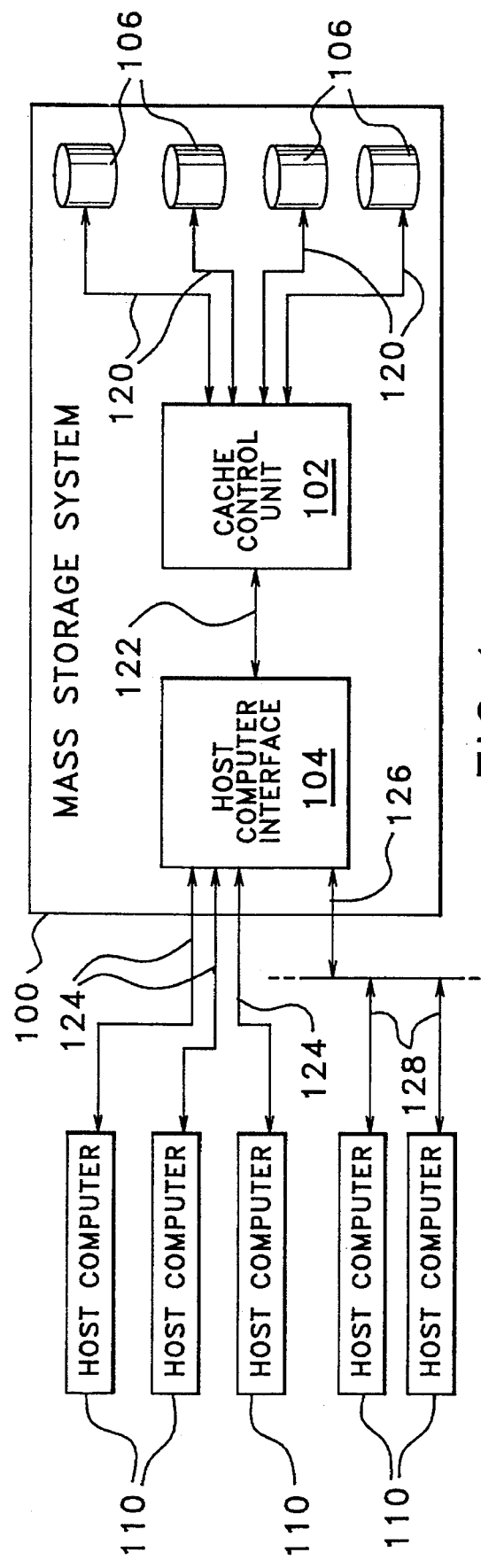
FIG. 1 shows a typical mass storage system which comprises the cache control system of the present invention.

Mass Storage System Architecture:

FIG. 1 shows a typical mass storage system 100 in which the methods and apparatus of the present invention are implemented. A plurality of host computer systems 110 are attached to mass storage system 100 via channels 124. Additional host computer systems 110 are attached to Local Area Network 128 (hereinafter referred to as LAN). Mass storage system 100 is also connected to LAN 128 via network connection 126. Host computer systems 110 exchange commands, status, and data with mass storage system 100 over channels 124 and LAN 128. Data transferred to mass storage system 100 is stored on storage devices 106. Storage devices 106 are shown in FIG. 1 as direct access storage devices (hereinafter referred to as DASD). One skilled in the art will recognize that storage devices 106 may be various types of DASD devices, such as magnetic or optical disk drives, semiconductor memory, or sequential access devices such as magnetic tape.

Host computer interface 104 controls the exchange of data, commands, and status with host computer systems 110 over channels 124 and over LAN 128 via network connection 126. Host computer interface 104 manages the protocols appropriate to each channel 124 as well as the methods required to manage multiple host computer systems 110 which are simultaneously exchanging information with mass storage system 100. Commands and data received from host computer systems 110 are applied to cache control unit 102 over channel 122. Data and status received by host computer interface 104 from cache control unit 102 over channel 122 are applied to channels 124 or LAN 128 to return information to host computer systems 110. Commands and data from host computer systems 110 are manipulated by cache control unit 102 to record and retrieve information on storage devices 106. Cache control unit 102 exchanges information with storage devices 106 over channels 120 and returns information to host computer interface 104 over channel 122.

Figure 2:
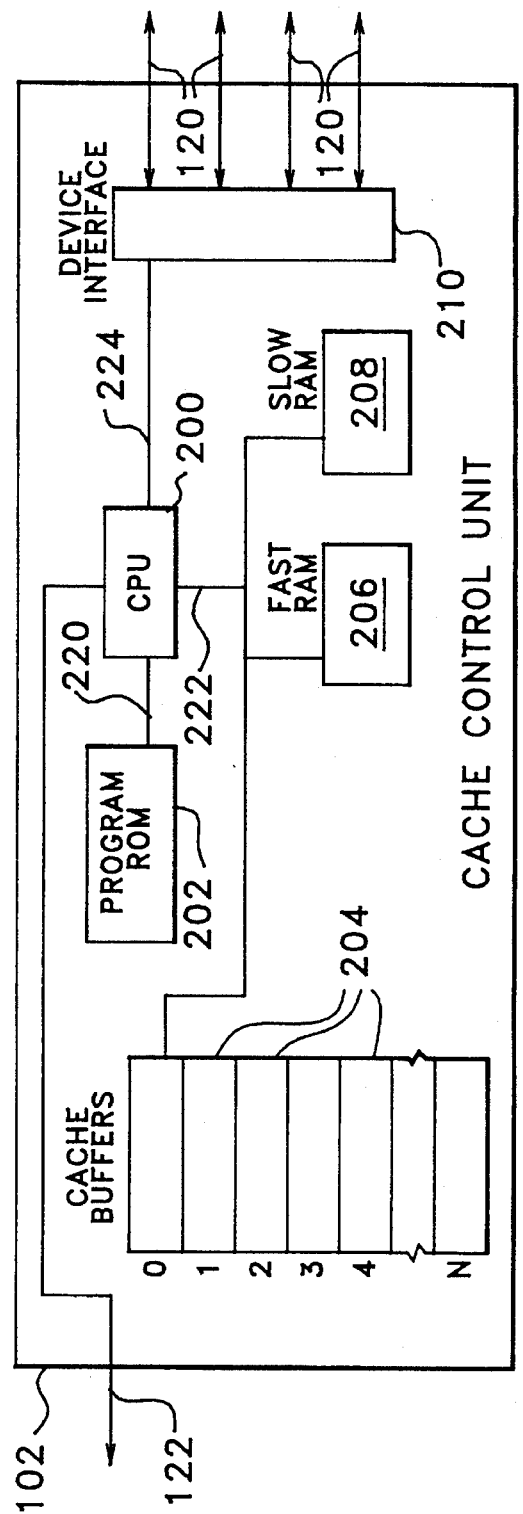
FIG. 2 shows additional detail of the cache control unit of FIG. 1 which operates to implement the system of the present invention.

Cache Control Unit Architecture;

FIG. 2 shows additional detail of cache control unit 102. CPU 200 controls operation of cache control unit 102, exchanges information with host computer interface 104 of FIG. 1 over channel 122, and records and retrieves data on storage devices 106 of FIG. 1 through device interface 210 over channels 224 and 120. Programs executing on CPU 200 are stored in program ROM memory 202 and fetched by CPU 200 over bus 220. CPU 200 reads and writes information in slow RAM 208, fast RAM 206, and cache buffers 204 over memory bus 222.

Cache buffers 204 are RAM memory buffers used to store recently accessed information read from, or written to, storage devices 106 of FIG. 1. As information is read or written on storage devices 106, CPU 200 determines that a buffer of information should be entered into an available cache buffer 204. Subsequent requests from host computer systems 110 to read the same buffer of information are satisfied by CPU 200 returning the information from cache buffer 204 over channel 120. Retrieving the information from cache buffers 204 is faster than re-reading the requested data from storage devices 106 of FIG. 1. The processes by which CPU 200 determines which requested information is appropriately entered into cache buffers 204 are well known to persons skilled in the art.

There are a finite number of cache buffers 204 labelled 0 through N. The total storage capacity of all cache buffers 204 is significantly smaller than the total storage capacity of all storage devices 106 of FIG. 1, therefor cache buffers 204 are frequently overwritten by discarding older data stored in a cache buffer to make room for more recently referenced data. In order to maximize performance of mass storage system 100 it is intended that all cache buffer 204 are filled with recently accessed information. When CPU 200 requires an unused cache buffer 204 to store recently accessed information, methods of the present invention are performed to rapidly locate a cache buffer 204 which is then overwritten to store more recently accessed information. The system of the present invention maintains control information which is utilized to identify a cache buffer 204 suitable for overwriting. Each time CPU 200 accesses a cache buffer 204 to retrieve information requested by a host computer system 110, system of the present invention is invoked to update control information relating to recent references to each cache buffer 204. When a cache buffer 204 needs to be located for overwriting, methods of the present invention utilize the information built over time regarding recent cache buffer references to locate the chronologically oldest cache buffer 204 which has system not recently been referenced by a host computer system 110.

Figure 3:
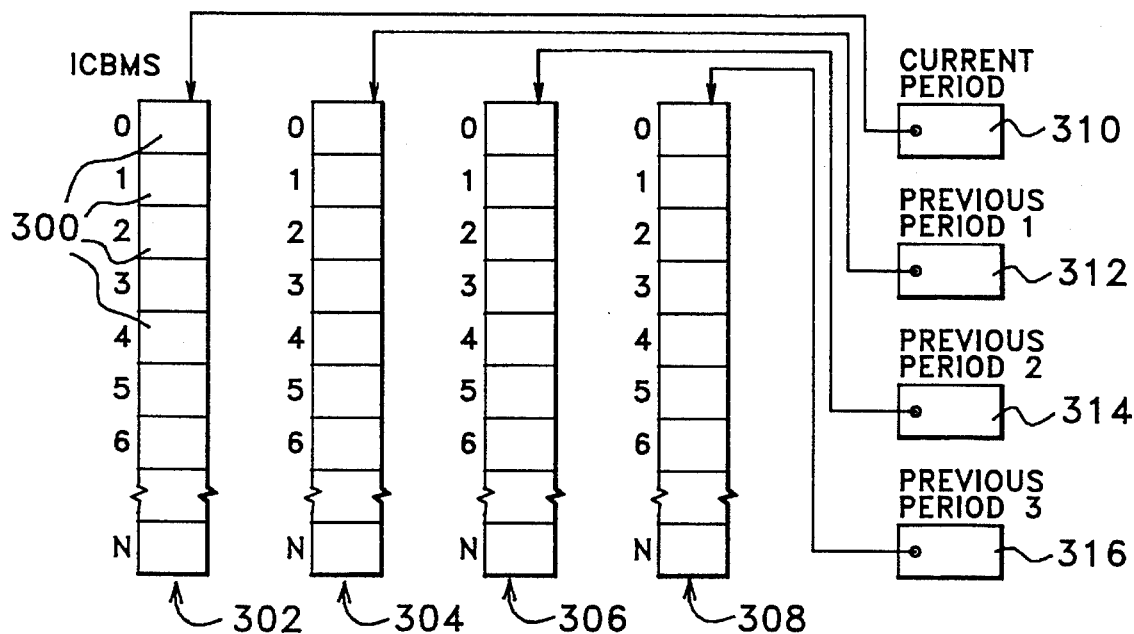
FIG. 3 shows a graphical representation of the ICBM data structures manipulated by operation of the system of the present invention.

Cache Buffer Reference Control Information—ICBMs:

The methods and apparatus of the present invention maintain data structures stored in fast RAM 206 and slow RAM 208 and containing control information relating to host computer system 110 references to each cache buffer 204. FIG. 3 depicts four in-cache bitmaps 302, 304, 306, and 308 (hereinafter referred to as ICBMs). Each ICBM, 302, 304, 306, and 308, is a RAM memory array of bits 300 labeled 0 through N. One bit 300 in each ICBM 302, 304, 306, and 308 corresponds to each cache buffer 204 of FIG. 2 labelled 0 through N. When set, a bit 300 0 through N in an ICBM indicates that the corresponding cache buffer 204 of FIG. 2 has been referenced by a host computer system 110 of FIG. 1. Until a cache buffer 204 is referenced the corresponding bit 300 in an ICBM 302 remains reset. ICBMs 302, 304, 306, and 308 are stored in fast RAM 206 of FIG. 2 to improve performance in operation of the methods of the present invention.

In the exemplary preferred embodiment shown in FIG. 3 four ICBMs are used to record cache buffer 204 references over time. ICBM pointers 310, 312, 314, and 316 point to the four ICBMs 302, 304, 306, and 308. ICBM pointer CP 310 (current pointer) points to the ICBM used during the current time period. ICBM pointers PP1 312 (previous pointer 1), PP2 314 (previous pointer 2), and PP3 316 (previous pointer 3) point to ICBMs used during the last three periods of time immediately preceding the current period of time. By testing bits appropriate 300 in all four ICBMs 302, 304, 306, and 308, CPU 200 determines whether a corresponding cache buffer 204 has been referenced during the current time period and the immediately preceding past three time periods. The duration of each period of time is predetermined based on desired performance characteristics of the mass storage system 100.

Figure 7A:
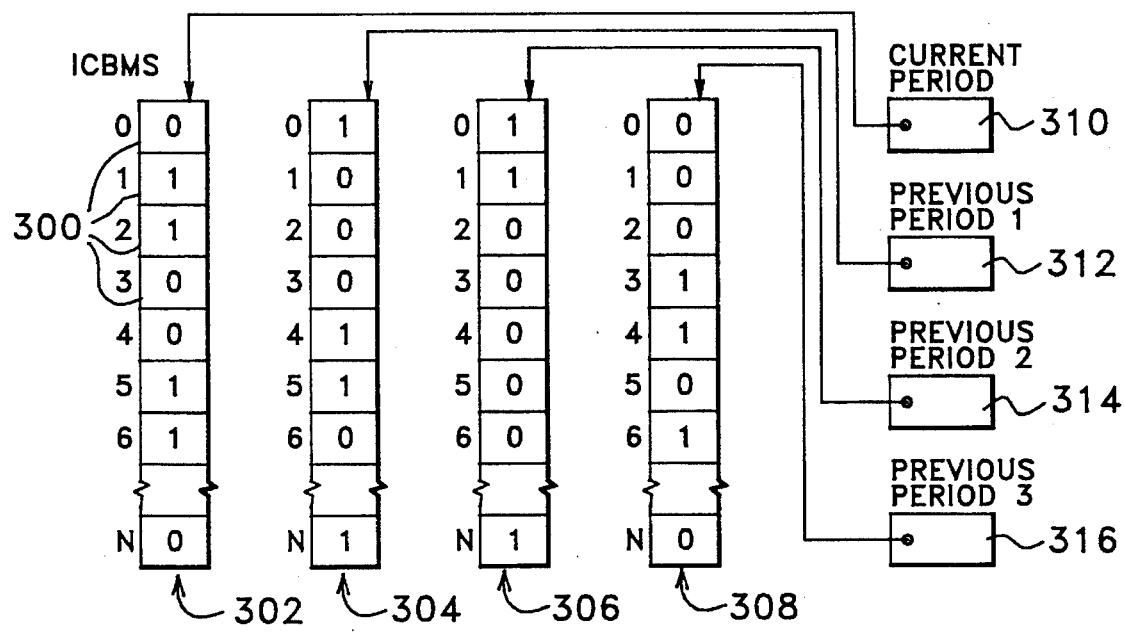
FIG. 7A shows a graphical representation of the ICBM data structures of FIG. 3 during the current time period of operation.
Figure 7B:
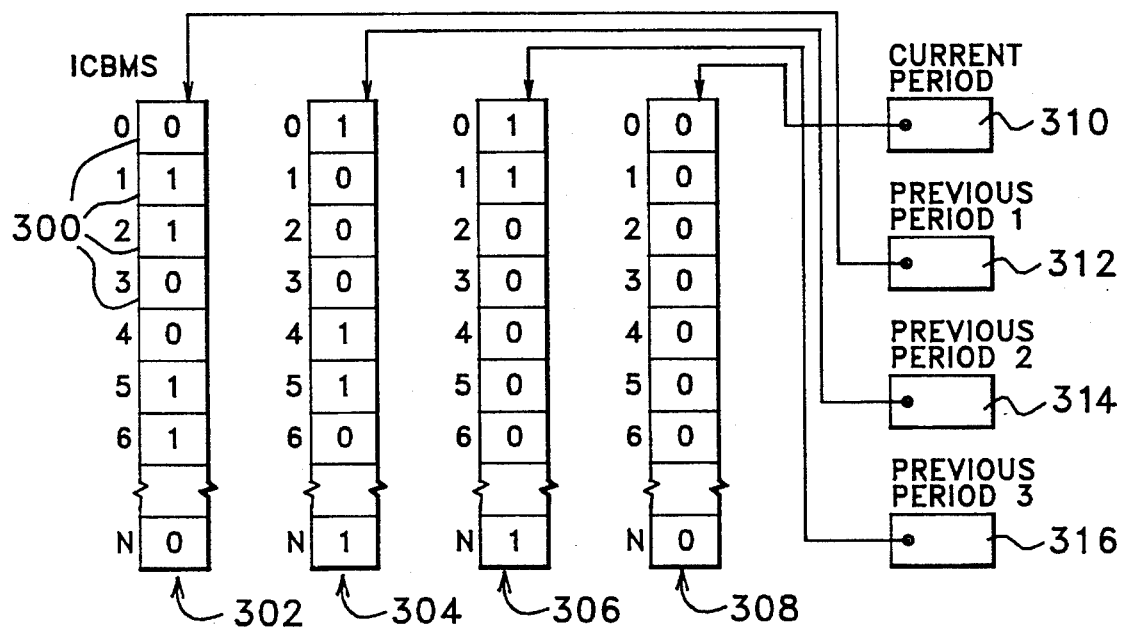
FIG. 7B shows a graphical representation of the ICBM data structures of FIG. 3 as changed at the end of the current time period and the start of a new time period of operation.

FIG. 7A shows an exemplary status of ICBMs 302, 304, 306, and 308 and ICBM pointers 310, 312, 314, and 316 during a current period of time. In FIG. 7A, ICBM pointer CP 310 points to ICBM 302 while ICBM pointers PP1 312, PP2 314, and PP3 316 point to ICBMs 304, 306, and 308, respectively. When the system of the present invention detects that the current period of time has expired, the ICBM pointers are "rotated" so that ICBM pointers CP 310, PP1 312, PP2 314, and PP3 316 point to ICBMs 308, 302, 304, and 306, respectively as shown in FIG. 7B. More generally, at the end of each time period, the ICBM pointers are rotated by the following assignments (where "temp" is a temporary variable used in the assignment process):

temp←PP3

PP3←PP2

PP2←PP1

PP1←CP

CP←temp

In addition, the bits 300 of ICBM 308 are reset to start a new current period. More generally, the bits are cleared in the new current ICBM pointed to by the ICBM pointer CP 310 after the above rotation steps are performed.

This rotation of ICBM pointers 310, 312, 314, and 316 maintains the current and last three previous time periods of cache buffer 204 references in ICBMs 302, 304, 306, and 308. It will be recognized by one skilled in the art that any number of ICBMs may be utilized as appropriate to meet the performance goals of the mass storage system with the associated addition of ICBM pointers.

Figure 4:
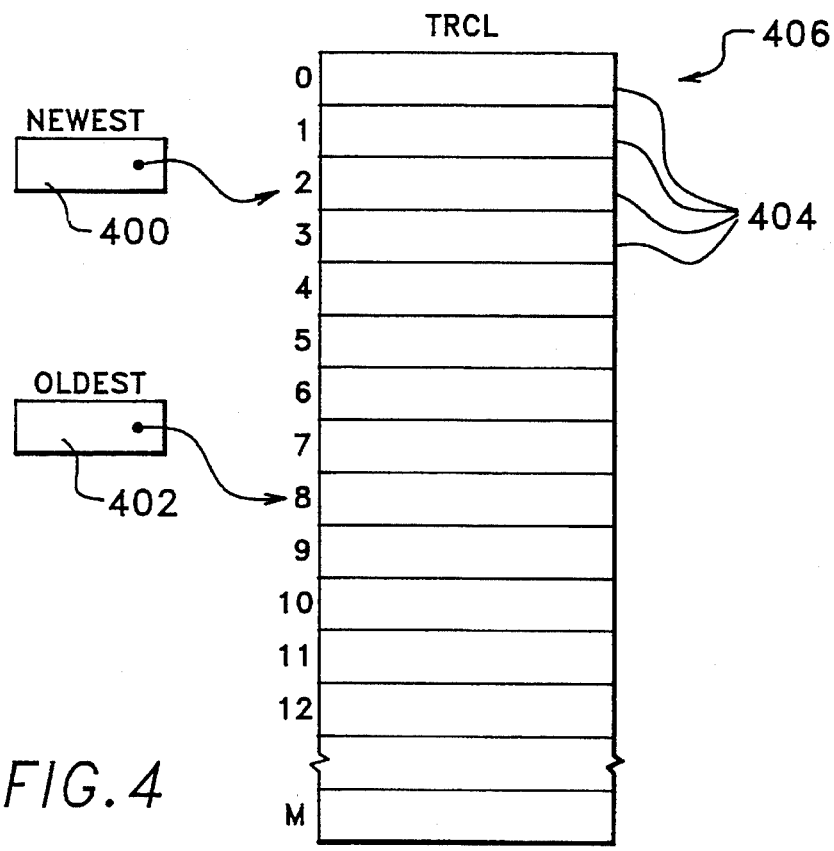
FIG. 4 shows a graphical representation of an exemplary embodiment of the TRCL data structures manipulated by operation of the system of the present invention.

Cache Buffer Reference Control Information—TRCLs:

In addition to the ICBM data structures maintained as described above, the of system of the present invention maintains a track reference count list data structure (hereinafter referred to as TRCL). FIG. 4 shows TRCL 406, a linear array of TRCL entries 404 labeled 0 through M. TRCL 406 is a depiction of a simplified embodiment of the structures maintained by the system of the present invention. The simplified exemplary embodiment depicted in FIG. 4 is used as a basis for later figures which depict the interaction of the TRCL structures and the ICBM structures of the present invention.

Each TRCL entry 404 of FIG. 4 includes the index number of a cache buffer 204 of FIG. 2 (0 through N as discussed above) and a corresponding virtual track address (hereinafter referred to as VTA). The VTA identifies a logical address in storage devices 106 of FIG. 1 whence the information in the corresponding cache buffer 204 was read. As discussed below, TRCL entries 404 are filled as cache buffers 204 are referenced by host computer systems 110 and are overwritten as cache buffers 204 are emptied for overwriting. Two pointers are used to manage TRCL 406 in a circular manner. NEWEST 400 points to the next TRCL entry 404 to be filled and OLDEST 402 points to the oldest TRCL entry 404 previously filled. NEWEST 400 is incremented to point to the next TRCL entry 404 after each TRCL entry 404 is filled due to a cache buffer reference. Similarly, OLDEST 402 is incremented to point to the next oldest TRCL entry after a TRCL entry 404 is overwritten. Both NEWEST 400 and OLDEST 402 are incremented in a circular manner so that when currently pointing to TRCL entry 404 labeled M, each is incremented to point to TRCL entry 404 labeled 0. TRCL 406 of FIG. 4 is at least large enough to preclude all TRCL entries 404 from being filled before cache buffers 204 are all filled. To preclude NEWEST 400 from ever passing OLDEST 402 due to the filling of all TRCL entries 404, the number of TRCL entries 404 must be 4×N (four being the number of time periods as depicted in FIG. 3 and N being the number of cache buffers 204).

TRCL 406, described above as a circular list, clearly discloses the structure and purpose of the TRCL data structure. Limitations of the apparatus used to implement the system of the present invention may force implementation changes to the structure of the TRCL circular list. For example, the apparatus of the present invention depicted in FIG. 2 utilizes a mixture of high speed fast RAM 206 and lower speed slow RAM 208 to achieve a price/performance goal. Fast RAM 206 provides rapid access to frequently used data structures and variables but does so at higher cost than does slow RAM 208. The capacity of fast RAM is limited due to the higher cost associated with the components. Depending on the performance goals of the mass storage system, the TRCL data structure may be too large to be contained in fast RAM 206 as a contiguous block of memory.

Figure 5A:
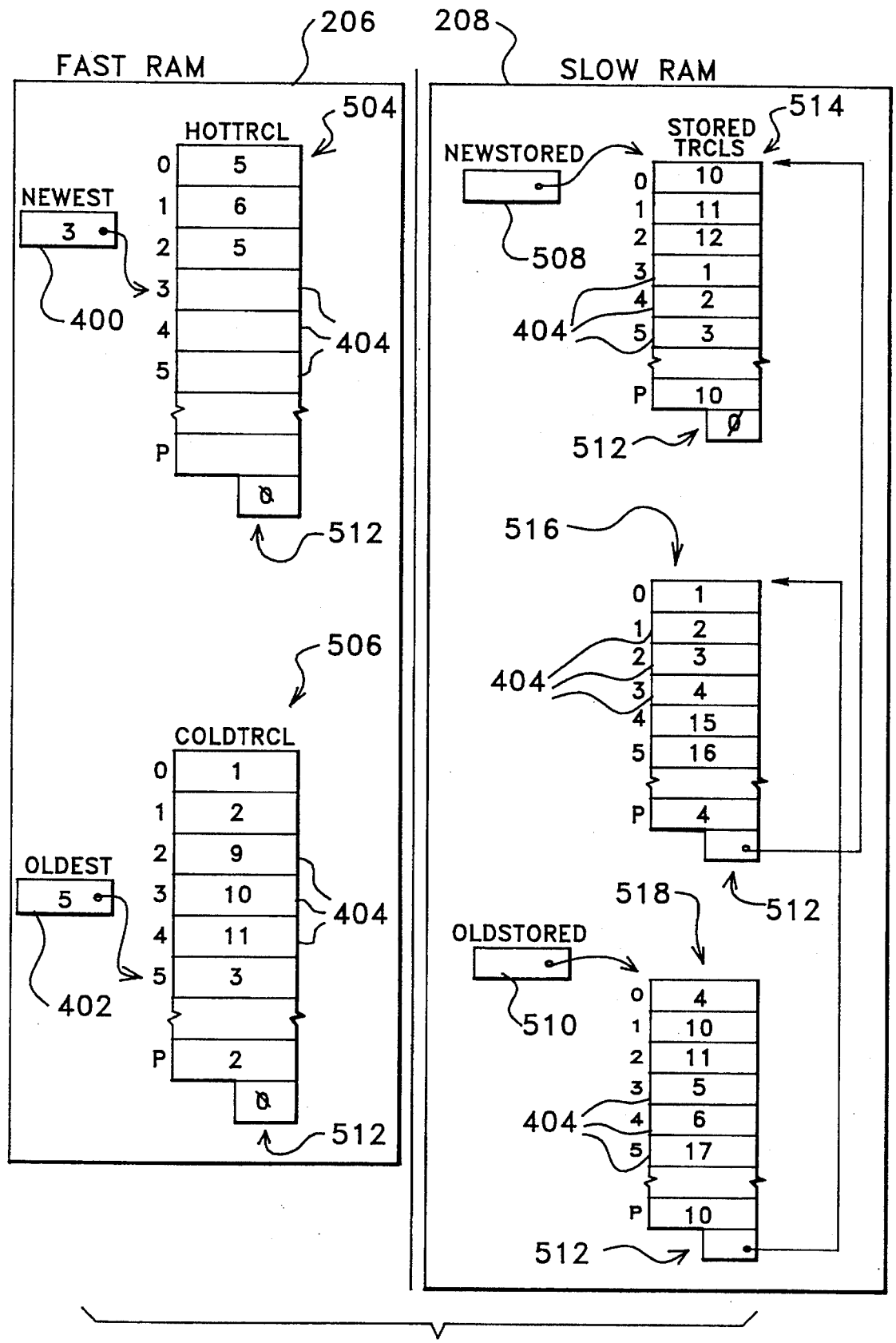
FIG. 5A shows a graphical representation of another exemplary embodiment of the TRCL data structures manipulated by operation of the system of the present invention.
Figure 5B:
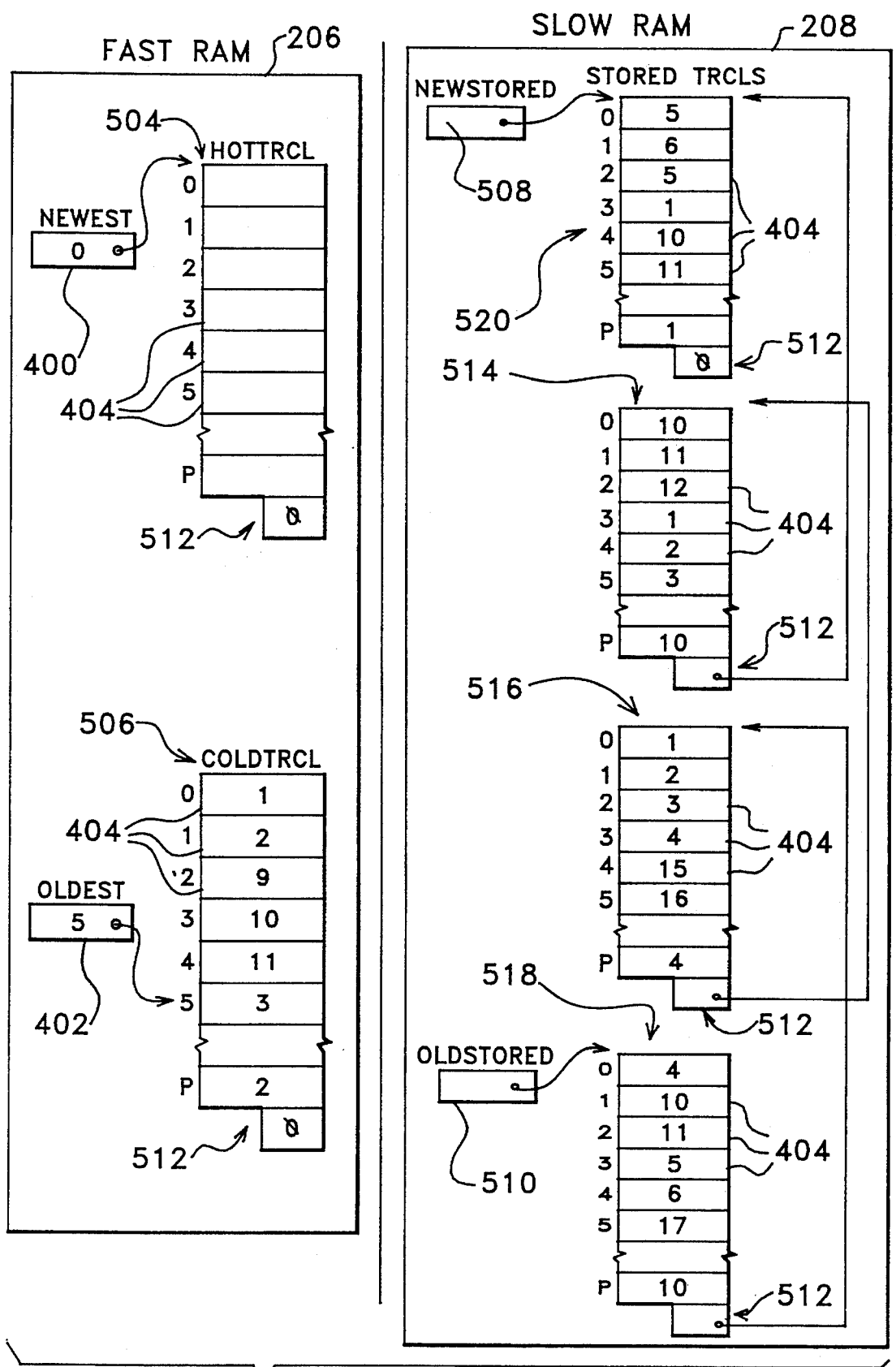
FIG. 5B shows a graphical representation of another exemplary embodiment of the TRCL data structures manipulated by operation of the system of the present invention after a filled "hot" TRCL segment is added to the stored segments.
Figure 5C:
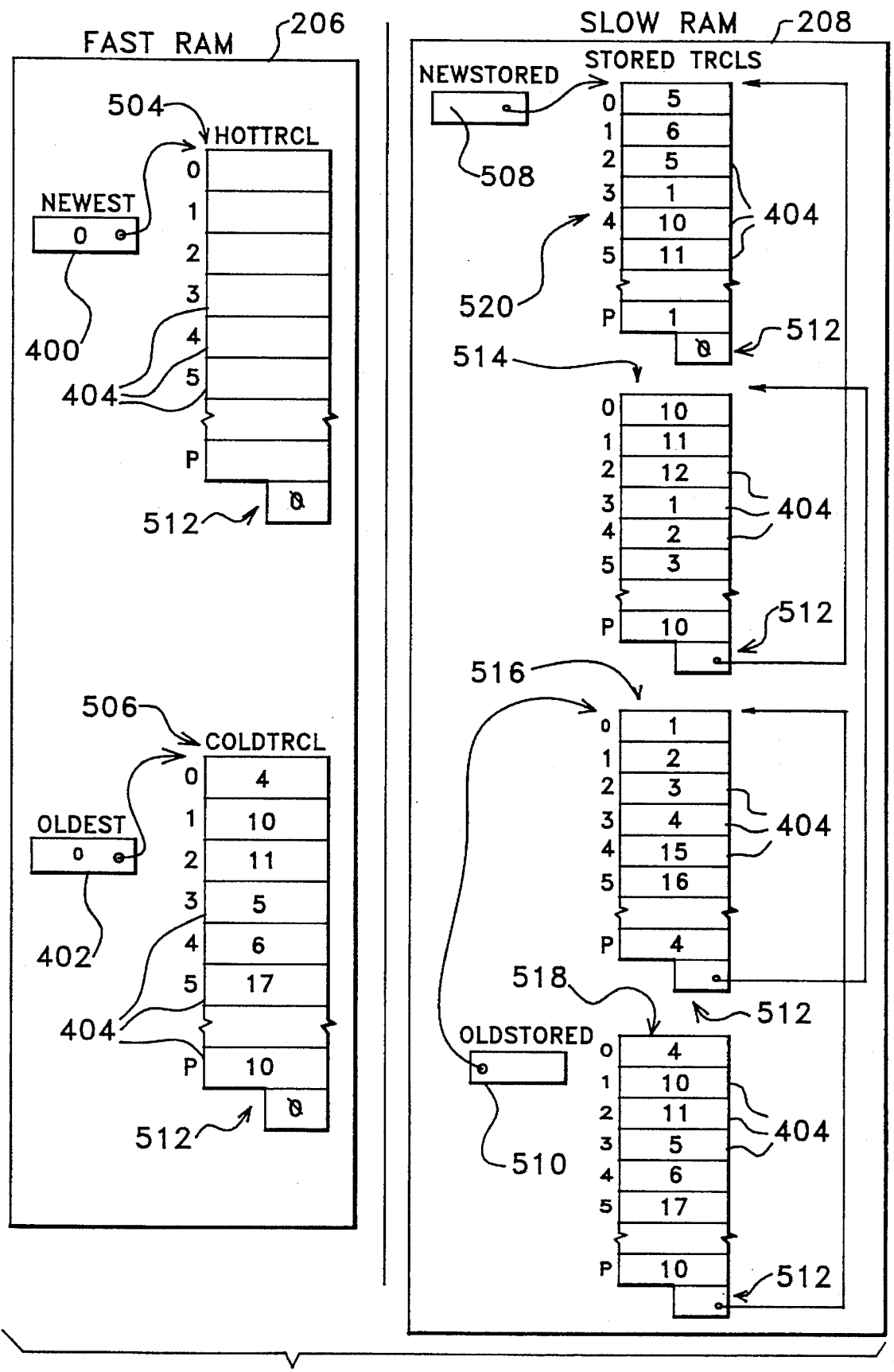
FIG. 5C shows a graphical representation of another exemplary embodiment of the TRCL data structures manipulated by operation of the system of the present invention after a "cold" TRCL segment is emptied and another stored segment is moved to the "cold" TRCL.

FIGS. 5A, 5B, and 5C depict another exemplary embodiment of the TRCL structures maintained by the system of the present invention. TRCL 406 of FIG. 4 is functionally identical to the TRCL structures depicted in FIGS. 5A, 5B, and 5C in the sense that both maintain and manipulate TRCL entries 404 in a circular manner. TRCL entries 404 of FIGS. 5A, 5B, and 5C are identical to those of FIG. 4 and contain information regarding cache buffers 204 referenced by host computer systems 110. However, TRCL entries 404 in FIG. 5A are grouped into segments so that portions of the list are maintained in fast RAM 206 and the remaining portions are maintained in slow RAM 208.

HOTTRCL 504, COLDTRCL 506 and STORED TRCLS 514, 516, and 518 of FIG. 5A are all segments of the list of a circular list of TRCL entries 404. Each of TRCL segments 504, 506, 514, 516, and 518 are comprised of TRCL entries 404 labeled 0 through P plus pointer field 512 which links each segment to the next segment which chronologically follows the segment. HOTTRCL 504 and COLDTRCL 506 are not on the linked list of TRCL segments and so do not use their respective pointer fields 512. HOTTRCL 504 and COLDTRCL 506 are stored in fast RAM 206 to improve performance in accessing the newest and oldest entries in the TRCL circular list. STORED TRCLS 514, 516, and 518 are stored in slow RAM 208 because they are less frequently accessed than are HOTTRCL 504 or COLDTRCL 506. NEWEST 400 and OLDEST 402 are also stored in fast RAM 206 to improve performance in use of these frequently accessed pointers.

OLDSTORED 510 is a pointer stored in slow RAM 208 and points to the oldest TRCL segment 518 among the STORED TRCLS. The pointer field 512 of STORED TRCL 518 points to the next, more recent, STORED TRCL 516 which in turn, through its pointer field 512, points to the most recent STORED TRCL 514. STORED TRCL 514 is the end of the list of STORED TRCLS depicted in FIG. 5A and therefor has a pointer field 512 set to zero indicating the end of the list. NEWSTORED 508 is a pointer stored in slow RAM 208 and points to STORED TRCL 514, the most recent TRCL segment stored in slow RAM 208 in FIG. 5A.

NEWEST 400 in FIGS. 5A, 5B, and 5C increments in a circular manner through the index numbers of TRCL entries 404 in HOTTRCL 504 labeled 0 through P. OLDEST 402 in FIGS. 5A, 5B, and 5C increments in like manner through index numbers 0 through P of TRCL entries 404 in COLDTRCL 506. As described above with reference to FIG. 4, NEWEST 400 is incremented each time an entry is added to HOTTRCL 504 in response to a cache buffer 204 being referenced by a host computer system 110 and OLDEST 402 is incremented in response to requests to overwrite a previously used cache buffer 204.

When HOTTRCL 504 is filled by recent host computer system 110 references to cache buffers 204 and NEWEST 400 is incremented from P to 0, the entire contents of HOTTRCL 504 are copied to a new STORED TRCL 520 as shown in FIG. 5B. In addition, pointer field 512 of STORED TRCL 514, (pointed to by NEWSTORED 508), is changed to point to the new STORED TRCL 520, the newest TRCL segment in the circular list of TRCL entries 404. Pointer NEWSTORED 508 is finally changed to point to new STORED TRCL 520. This has the effect of adding new STORED TRCL 520 to the end of the list of TRCL segments headed by the pointer OLDSTORED 510.

When COLD TRCL 506 is emptied and OLDEST 402 is incremented from P to 0, the contents of STORED TRCL 518 are copied to COLDTRCL 506. STORED TRCL 518 is the oldest TRCL segment among STORED TRCLS and is pointed to by OLDSTORED 510 in FIG. 5B. FIG. 5C shows COLDTRCL 506 updated with the contents of STORED TRCL 518 and OLDSTORED 510 updated to point to the next oldest STORED TRCL 516 (previously pointed to by pointer field 512 of STORED TRCL 518). STORED TRCL 518 is now available for adding a new STORED TRCL to the list as described above with reference to the filling of HOTFRCL 504.

One skilled in the art will recognize that the circular list depicted in FIG. 4 is representative of many circular list data structures. FIGS. 5A through 5C are exemplary of a specific implementation of a circular list wherein the circular list itself along with control parameters for managing the circular list are divided between slower and faster memory devices. It will be apparent to those skilled in the art that many other specific implementations of a circular list may be expressed which are within the spirit and scope of the present invention.

Figure 6A:
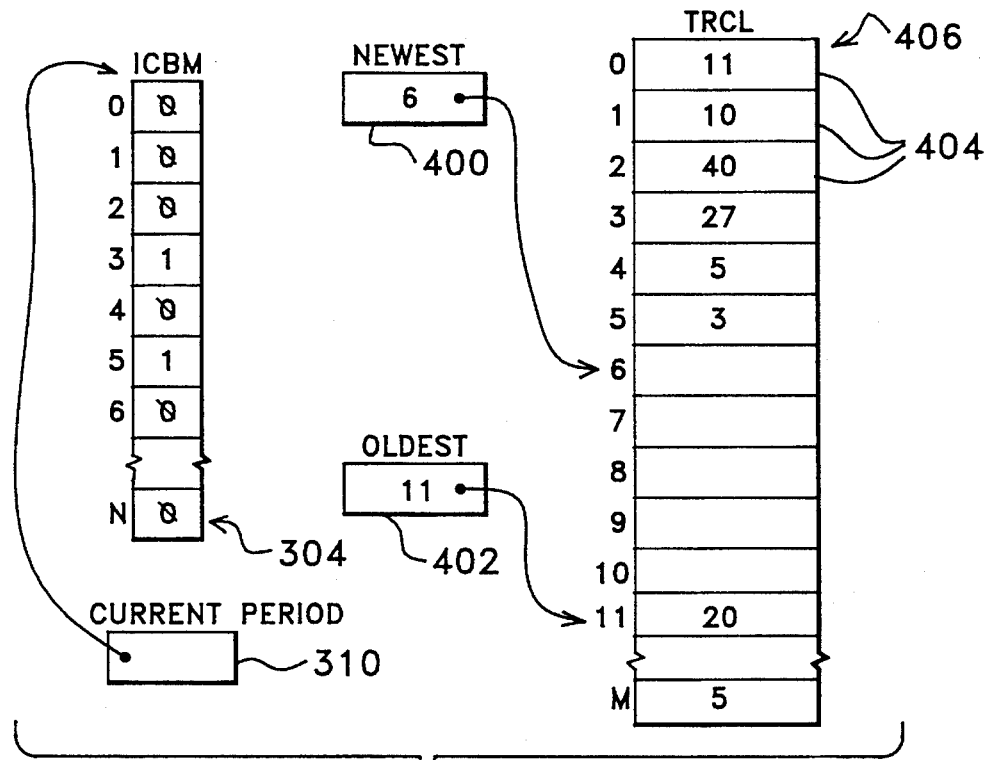
FIG. 6A shows a graphical representation of interactions between the ICBM and TRCL data structures of FIGS. 3 and 4 manipulated by operation of the system of the present invention.
Figure 6B:
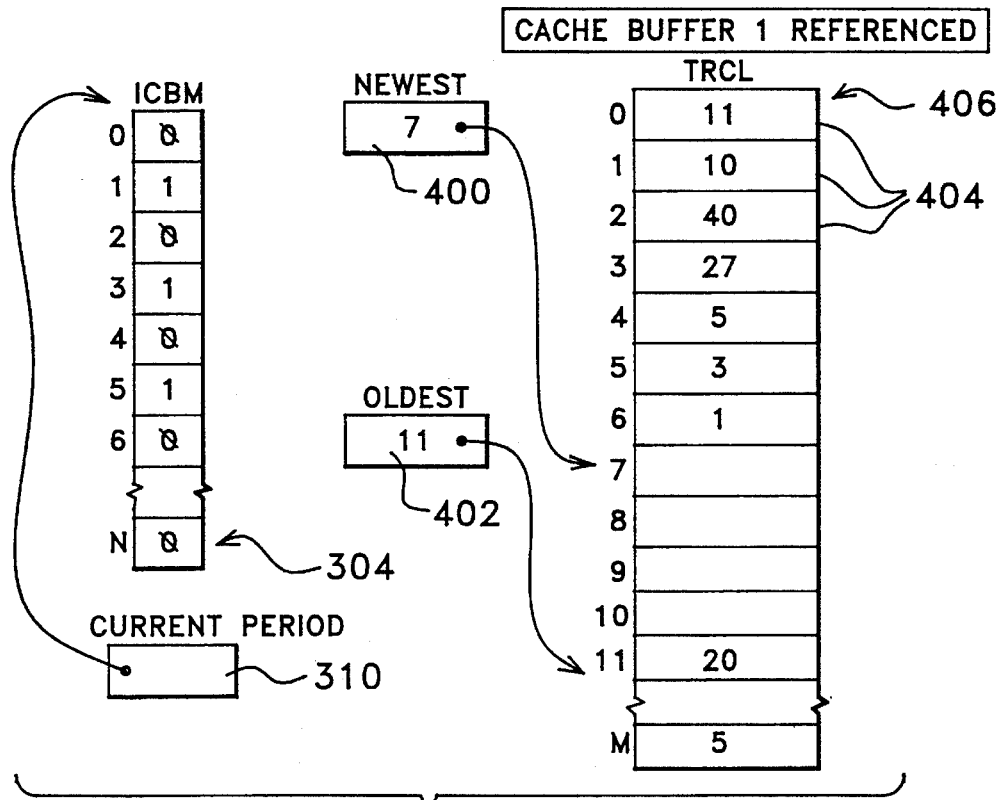
FIG. 6B shows a graphical representation of changes in, and interactions between, the ICBM and TRCL data structures of FIGS. 3 and 4 manipulated by operation of the system of the present invention.
Figure 6C:
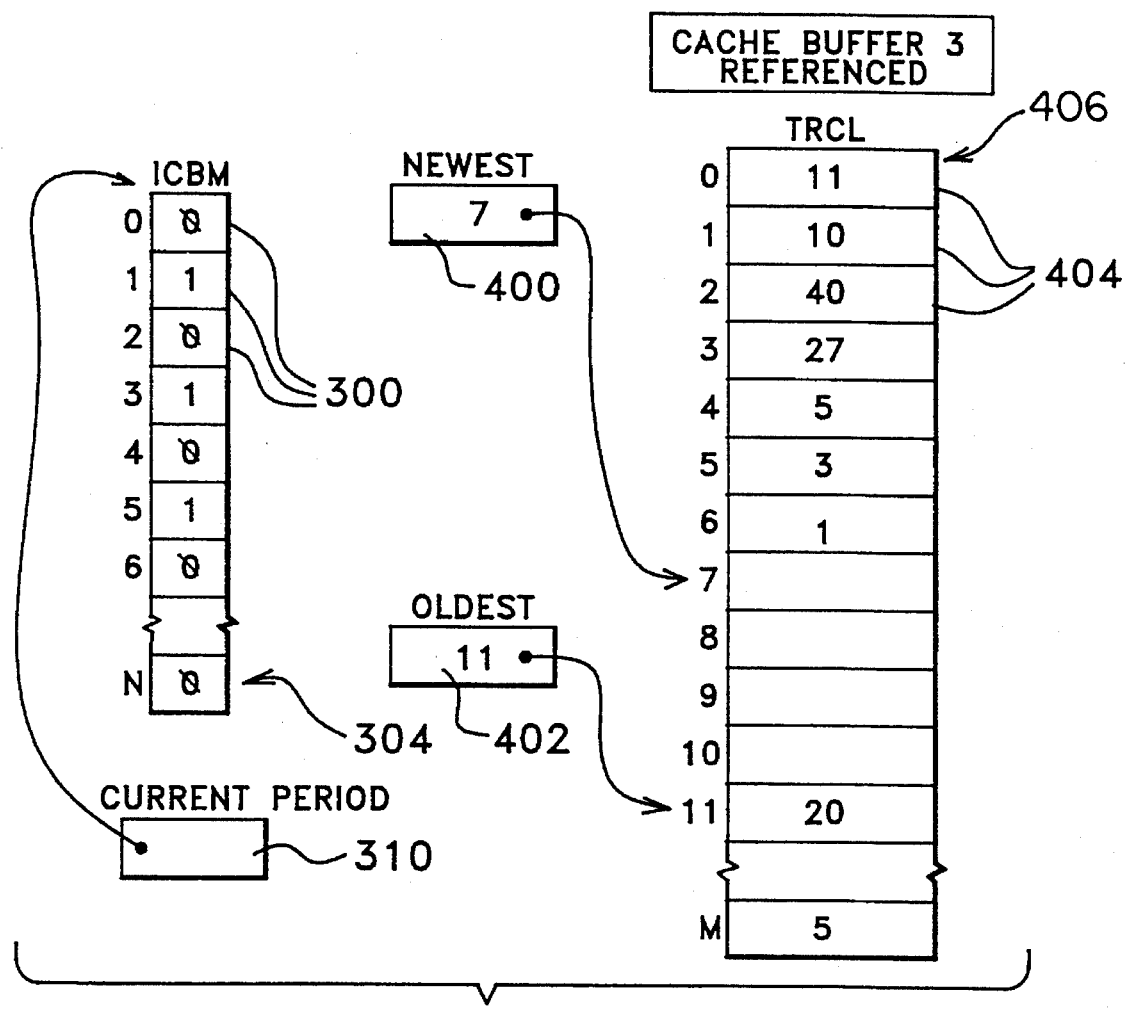
FIG. 6C shows a graphical representation of additional changes in, and interactions between; the ICBM and TRCL data structures of FIGS. 3 and 4 manipulated by operation of the system of the present invention.

Cache Buffer Reference Control Information—Cache Buffer Reference Example:

FIGS. 6A, 6B, and 6C show a graphical example of the changes in the current ICBM 304 (currently pointed to by CP 310) and TRCL 406 due to references to cache buffers 204 of FIG. 2 by host computer systems 110 of FIG. 1. FIG. 6A depicts an initial state wherein ICBM pointer CP 310 points to ICBM 304 used during the current period of time. Cache buffer numbers 3 and 5 are shown to have been referenced recently as corresponding set bits 300 in ICBM 304. In addition, NEWEST 400 is pointing to TRCL entry number 6 and OLDEST 402 points to TRCL entry number 11. TRCL entry numbers 4 and 5 indicate the cache buffer numbers 5 and 3 were most recently referenced by a host computer system. FIG. 6B depicts the changes in ICBM 304 and TRCL 406 after a host computer system 110 references cache buffer number 1. A bit 300 in ICBM 304 labeled 1 corresponding to cache buffer number 1 has been set, TRCL entry number 6 has been written to indicate cache buffer number 1 was most recently referenced, and NEWEST 400 has been incremented to point to TRCL entry number 7, the next TRCL entry 404 to be filled by a host computer system 110 reference to a cache buffer 204. FIG. 6C shows no change beyond FIG. 6B in the status of ICBM 304, TRCL 406, and NEWEST 400 after a reference to cache buffer number 3 because the corresponding bit 300 labeled 3 in ICBM 304 is set indicating that cache buffer number 3 has already been referenced during the current period of time. The methods which perform this manipulation are discussed in more detail below.

Cache Buffer Reference Control Information—Cache Buffer Overwriting

EXAMPLE

Figure 8A:
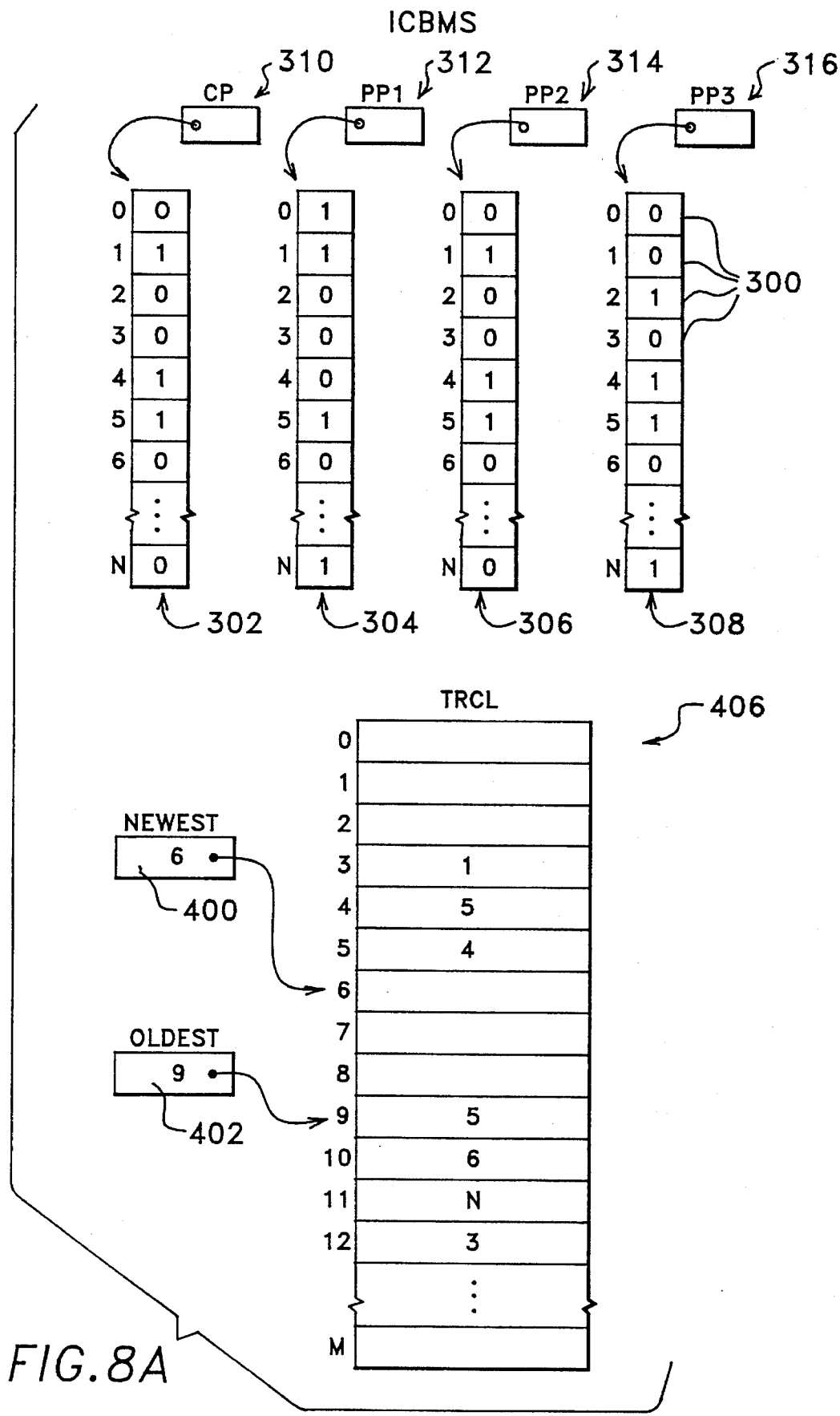
FIG. 8A shows another graphical representation of interactions between the ICBM and TRCL data structures of FIGS. 3 and 4 as manipulated by operation of the system of the present invention.
Figure 8B:
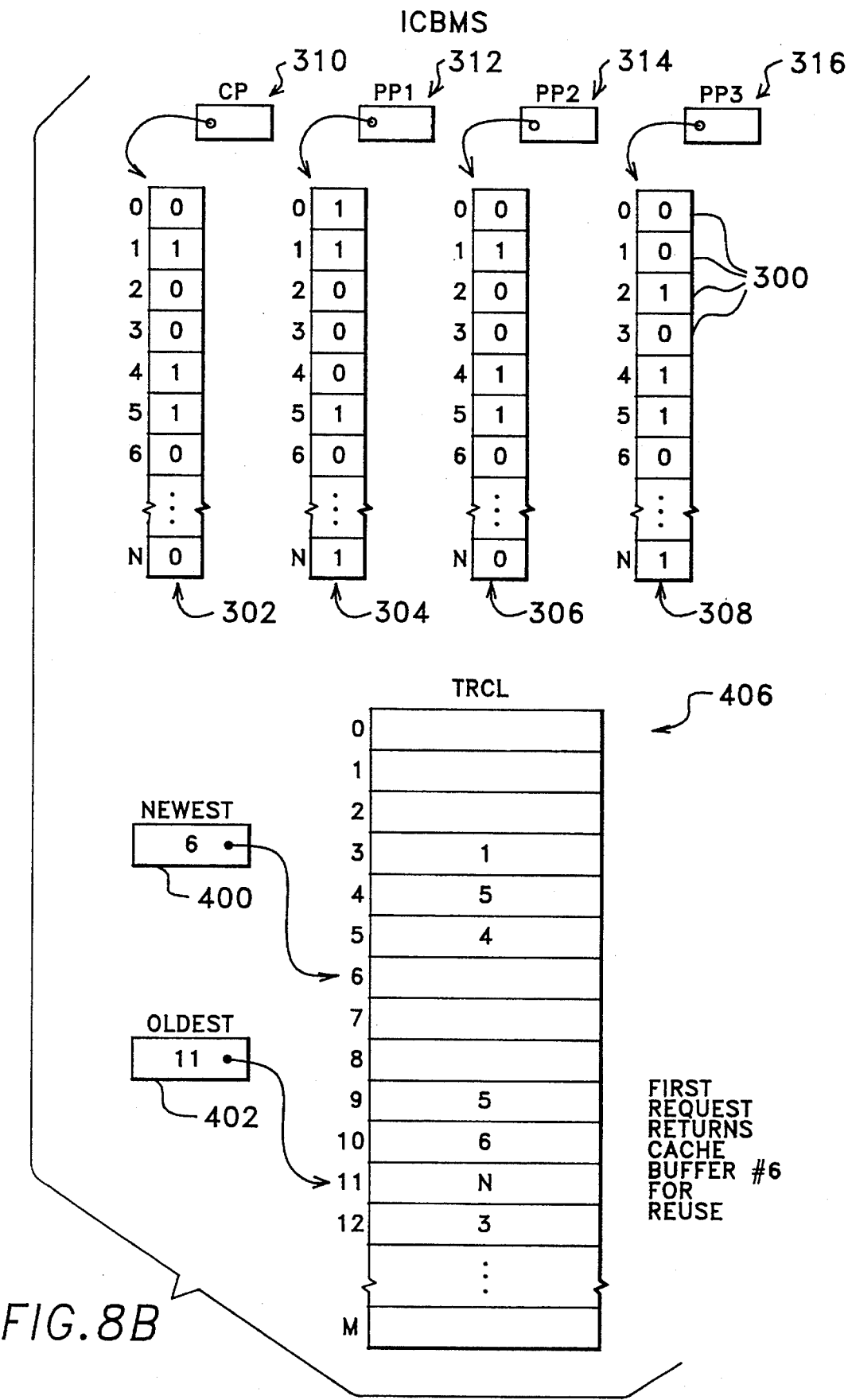
FIG. 8B shows another graphical representation of changes in, and interactions between, the ICBM and TRCL data structures of FIGS. 3 and 4 as manipulated by operation of the system of the present invention.
Figure 8C:
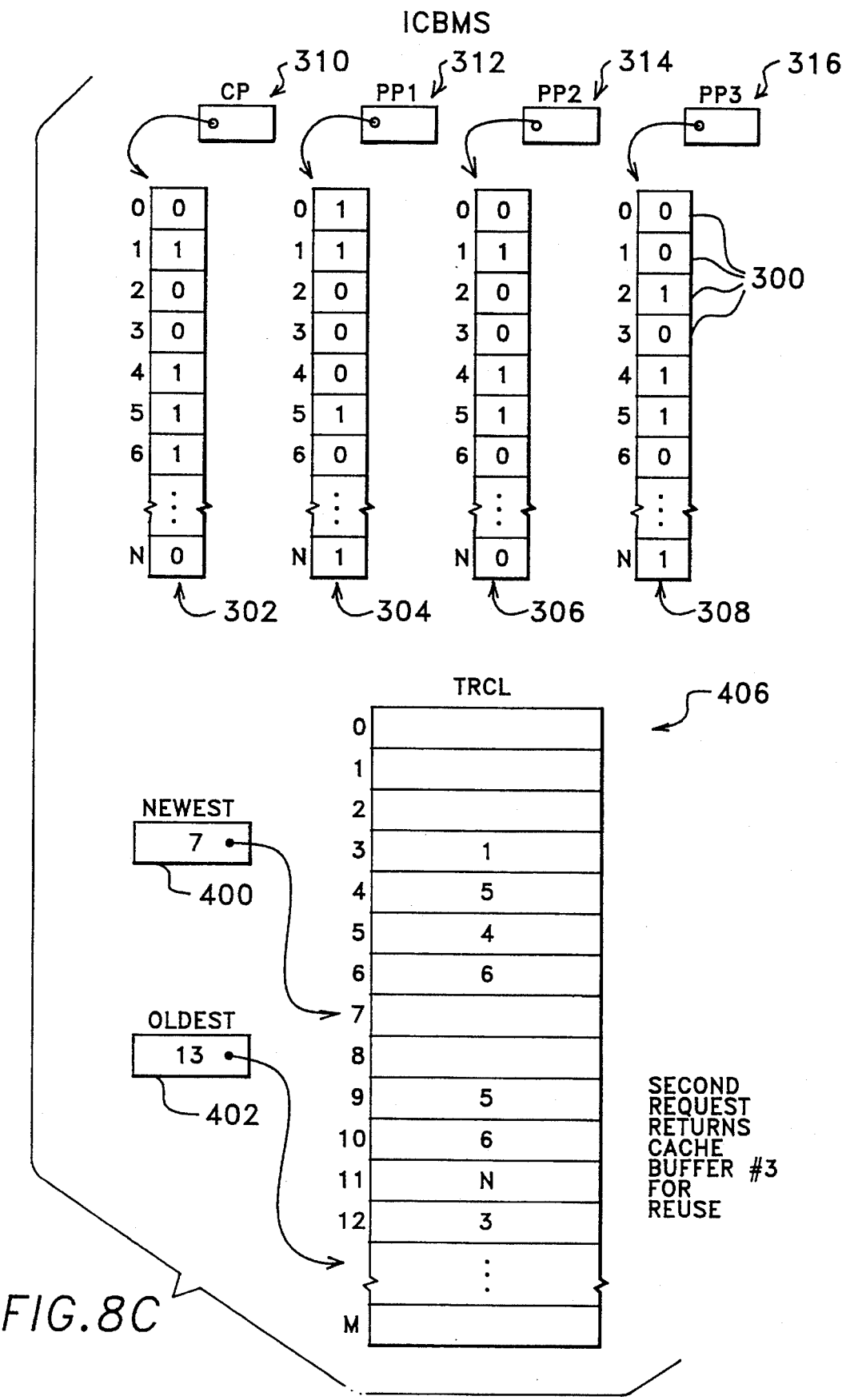
FIG. 8C shows another graphical representation of additional changes in, and interactions between, the ICBM and TRCL data structures of FIGS. 3 and 4 as manipulated by operation of the system of the present invention.

FIGS. 8A through 8C show a graphical example of the changes in the current ICBM 302 (currently pointed to by CP 310) and the TRCL 406 due to requests to locate a cache buffer 204 of FIG. 2 available for overwriting with more recently referenced information. As discussed above, such requests originate from other methods performed within cache control unit 102 which determine that a particular host computer system reference should be cached for rapid subsequent retrieval. ICBM pointers CP 310, PP1 312, PP2 314, and PP3 316 remain static through the sequence of FIGS. 8A through 8C pointing to ICBMs 302, 304, 306, and 308, respectively indicating that the current period of time does not expire through the sequence of figures. FIG. 8A depicts an initial state wherein cache buffer numbers 1, 4, and 5 are shown to have been referenced recently as corresponding set bits 300 in ICBM 302. In addition, NEWEST 400 is pointing to TRCL entry number 6 and OLDEST 402 points to TRCL entry number 9. TRCL entry numbers 3, 4, and 5 indicate that cache buffer numbers 1, 4, and 5 were most recently referenced by a host computer system. FIG. 8B depicts the changes in ICBM 302 and OLDEST 402 after the present methods process a request that a cache buffer 204 be made available for overwriting.

The system of the present invention begins processing a request to locate a cache buffer for overwriting by inspecting the cache buffer index number in the TRCL entry 404 pointed to by OLDEST 402. As shown in FIG. 8A OLDEST 402 points at TRCL entry number 9. TRCL entry number 9 indicates that a previous reference to cache buffer number 5 is the oldest previous reference in TRCL 406.

The system of the present invention next tests the bit 300 labeled 5 in each ICBM 302, 304, 306, and 308 to determine if the corresponding cache buffer number 5 has been recently referenced again (during the current time period or the past three time periods preceding the current period). As depicted in FIGS. 8A through 8C, cache buffer number 5 has been referenced in all four time periods and is therefor not currently available for overwriting. The system of the present invention next increments OLDEST 402 to point to TRCL entry number 10. Processing of TRCL entry number 9 is completed until the entry is again filled, as discussed above, in response to a new cache buffer 204 reference by a host computer system 110. TRCL entry number 10 indicates that a previous reference to cache buffer number 6 is now the oldest previous reference in TRCL 406. The bits 300 labeled 6 in each ICBM 302, 304, 306, and 308 are now tested to determine if cache buffer number 6 has been recently referenced. As shown in the ICBMs of FIGS. 8A and 8B, cache buffer number 6 has not been referenced in any of the four periods of time represented by ICBMs 302, 304, 306, and 308 (pointed to by ICBM pointers CP 310, PP1 312, PP2 314, and PP3 316 respectively). Cache buffer number 6 is therefor currently available for overwriting. OLDEST 402 is again incremented to the next TRCL entry 404 to be tested and now points to TRCL entry number 11. This processing of the pointers completes, returning an identifier that cache buffer number 6 is available for overwriting.

FIG. 8C depicts the changes in ICBM 302 and OLDEST 402 after other methods within cache control unit 102 request for a second time that a cache buffer 204 be made available for overwriting. The system of the present invention responds to this second request as described above for the first request. As shown in FIG. 8B OLDEST 402 points at TRCL entry number. TRCL entry number 11 indicates that a previous reference to cache buffer number N is the oldest previous reference in TRCL 406. Testing the bits 300 labeled N in each ICBM 302, 304, 306, and 308 to reveals that cache buffer number N has been referenced in at least one of the recent time periods and is therefor not currently available for overwriting. The system of the present invention next increments OLDEST 402 to point to TRCL entry number 12. TRCL entry number 12 indicates that a previous reference to cache buffer number 3 is now the oldest previous reference in TRCL 406. The bits 300 labeled 3 in each ICBM 302, 304, 306, and 308 are now tested to determine if cache buffer number 3 has been recently referenced. As shown in the ICBMs of FIGS. 8A, 8B, and 8C, cache buffer number 3 has not been referenced in any of the four periods of time represented by ICBMs 302, 304, 306, and 308. Cache buffer number 3 is therefor currently available for overwriting and the system of the present invention completes its processing and returns that information after incrementing OLDEST 402 to point at TRCL entry number 13.

FIG. 8C also depicts the changes in ICBM 302, TRCL entry number 6 and NEWEST 400 due to the overwriting of cache buffer number 6. TRCL entry number 6 now indicates that cache buffer number 6 is the most recently referenced cache buffer. The corresponding bit 300 labelled 6 in ICBM 302 (the current time period ICBM) is also set indicating the recent reference. Finally, NEWEST 400 has been updated to point at TRCL entry number 7, the next available entry in TRCL 406.

Figure 9:
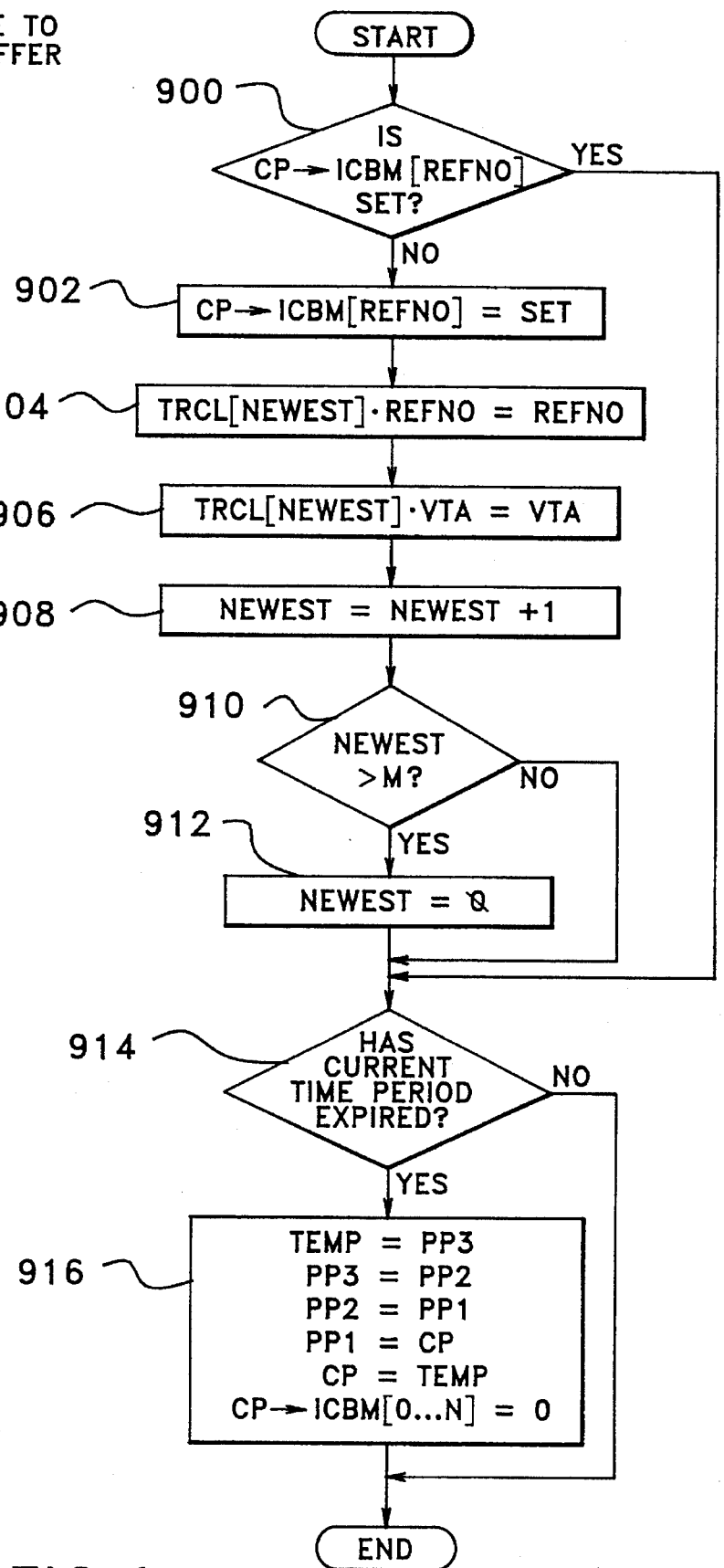
FIG. 9 is a flowchart of the operation of system of the present invention which operate in response to a host reference to an existing buffer in cache.

Methods of the Present Invention—Cache Buffer Reference:

FIG. 9 is a flowchart of the method of the present invention invoked when a cache buffer 204 of FIG. 2 has been referenced by a request from a host computer system 110 of FIG. 1. The index number of the cache buffer 204 referenced (between 0 and N inclusive) is presumed to be provided at the start of the processing for this method in a variable named REFNO.

Element 900 tests the bit 300 corresponding to REFNO in the ICBM bit array pointed to by CP 310, the ICBM pointer for the current time period. If the bit is set, indicating that the cache buffer 204 indexed by the value in REFNO has already been referenced in the current time period, then the processing of this method is complete. If the bit 300 corresponding to REFNO in the current ICBM is not set, processing continues with element 902.

Element 902 sets the bit 300 corresponding to REFNO in the ICBM bit array pointed to by CP 310, the ICBM pointer for the current time period.

Element 904 writes the provided REFNO of the cache buffer referenced into a field of a TRCL entry 404 indexed by the NEWEST 400 value.

Element 906 writes the provided VTA of the cache buffer referenced into a field of the TRCL entry 404 indexed by the NEWEST 400 value.

Element 908 increments NEWEST 400 to the next sequential index into TRCL 406. This is the location to be filled with the next invocation of this method.

Element 910 tests whether the incremented value of NEWEST 400 is greater than M (the maximum index for TRCL entries). If NEWEST 400 is not greater than M, processing continues with element 914, else processing continues with element 912.

Element 912 sets NEWEST 400 to 0, the first possible index into TRCL 406. This is the location to be filled with the next invocation of this method. Those skilled in the art will recognize that elements 908, 910 and 912 may be combined into an element which applies modulo arithmetic to limit the range of NEWEST 400 to 0 through M after incrementing the value.

Element 914 determines whether the pre-determined period of time for the current time period has expired. If the current period has not expired, processing of this method is complete, else processing continues with element 916.

Element 916 rotates ICBM pointers CP 310, PP1 312, PP2 314, and PP3 316 as described above with reference to FIGS. 7A and 7B. In addition, all bits are reset in the ICBM bit array pointed to by CP 310 after rotation of the pointers. This prepares the ICBM structures for the start of a new time period. The processing of this method is complete.

Figure 10:
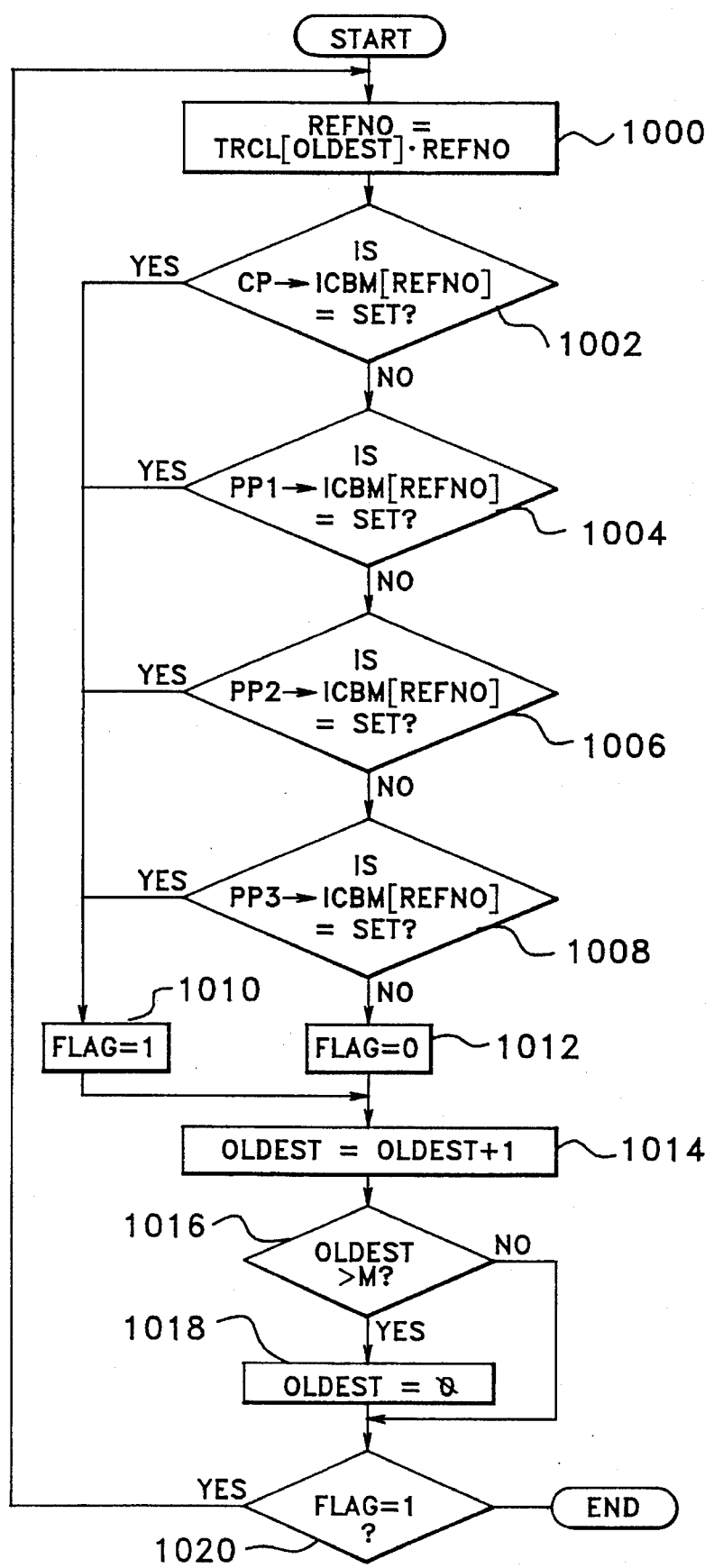
FIG. 10 is a flowchart of the operation of system of the present invention which operate in response to a request to locate a cache buffer appropriate for overwriting with more recently referenced information.

Methods of the Present Invention—Locate Cache Buffer for Overwriting:

FIG. 10 is a flowchart of the method of the present invention invoked when other methods operating in cache control unit 102 of FIG. 2 determine that a cache buffer 204 is required to hold recently accessed information. The index number of the cache buffer 204 located (between 0 and N inclusive) is presumed to be returned in a variable named REFNO.

Element 1000 sets the variable REFNO to the value previously written into a field of the TRCL entry 404 indexed by the current value in OLDEST 402. The REFNO value previously written is the cache buffer index number written above in operation of element 904 when the corresponding cache buffer was referenced.

Element 1002 tests the bit 300 corresponding to REFNO in the ICBM bit array pointed to by CP 310, the ICBM pointer for the current time period. If the bit is set, indicating that the cache buffer 204 indexed by the value in REFNO has been referenced in the current time period, then the processing continues with element 1010 because the buffer is unavailable at this time for overwriting. If the bit 300 corresponding to REFNO in the current ICBM is not set, processing continues with element 1004.

Element 1004 tests the bit 300 corresponding to REFNO in the ICBM bit array pointed to by PP1 312, the ICBM pointer for the first previous time period. If the bit is set, indicating that the cache buffer 204 indexed by the value in REFNO has been referenced in the current time period, then the processing continues with element 1010 because the buffer is unavailable at this time for overwriting. If the bit 300 corresponding to REFNO in the current ICBM is not set, processing continues with element 1006.

Element 1006 tests the bit 300 corresponding to REFNO in the ICBM bit array pointed to by PP2 314, the ICBM pointer for the second previous time period. If the bit is set, indicating that the cache buffer 204 indexed by the value in REFNO has been referenced in the current time period, then the processing continues with element 1010 because the buffer is unavailable at this time for overwriting. If the bit 300 corresponding to REFNO in the current ICBM is not set, processing continues with element 1008.

Element 1008 tests the bit 300 corresponding to REFNO in the ICBM bit array pointed to by PP3 316, the ICBM pointer for the third previous time period. If the bit is set, indicating that the cache buffer 204 indexed by the value in REFNO has been referenced in the current time period, then the processing continues with element 1010 because the buffer is unavailable at this time for overwriting. If the bit 300 corresponding to REFNO in the current ICBM is not set, processing continues with element 1012.

Element 1010 sets a flag to one to indicate that processing thus far has not found a suitable cache buffer available for overwriting. Processing continues with element 1014.

Element 1012 sets a flag to zero to indicate that processing thus far has found a suitable cache buffer available for overwriting. Processing continues with element 1014.

Element 1014 increments OLDEST 402 to the next sequential index into TRCL 406. This is the location to be tested for overwriting next in operation of this method.

Element 1016 tests whether the incremented value of OLDEST 402 is greater than M (the maximum index for TRCL entries). If OLDEST 402 is not greater than M, processing continues with element 1020, else processing continues with element 1018.

Element 1018 sets OLDEST 402 to 0, the first possible index into TRCL 406. This is the location to be tested for overwriting next in operation of this method. Those skilled in the art will recognize that elements 1014, 1016, and 1018 may be combined into an element which applies modulo arithmetic to limit the range of OLDEST 400 to 0 through M after incrementing the value.

Element 1020 tests the setting of the flag from operation of either element 1010 or 1012. If flag is set to 1 indicating processing must continue to locate a cache buffer 204 suitable for overwriting, then processing continues with element 1000. If flag is set to zero then processing of this method completes and the cache buffer 204 identified by the index value in REFNO is returned for overwriting in other caching methods within cache control unit 102.

It is expressly understood that the claimed invention is not to be limited to the description of the preferred embodiment but encompasses other modifications and alterations within the scope and spirit of the inventive concept.

We claim:

1. In a mass storage system connectable to a host computer system through a cache buffer management subsystem comprising a plurality of cache buffers for storing data, a method for locating one of said plurality of cache buffers to be overwritten with data, using a two level cache buffer management process, comprising the steps of:

maintaining a cache buffer history table which indicates cache buffer usage on a per cache buffer basis for each of N predetermined time intervals, where N is a positive integer greater than 1;

maintaining a cache buffer list, comprising a circular list having a plurality of entries to identify cache buffer usage in chronological order, including, in response to a reference to a cache buffer during the present one of said N predetermined time intervals, performing the steps of:

determining whether said referenced cache buffer has not been previously referenced by said host computer system during said present one of said N predetermined time intervals; and in response to said determination that said referenced cache buffer has not been previously referenced by said host computer system during said present one of said N predetermined time intervals, adding an entry to said circular list, the added entry containing information identifying said referenced cache buffer;

in response to a request to locate any one of said cache buffers available to be overwritten, performing the steps of:

locating in said circular list an entry identifying the oldest one of said plurality of cache buffers which was previously referenced by said host computer system;

checking said identified oldest cache buffer in said cache buffer history table to determine whether said identified oldest cache buffer has been used during said N predetermined time intervals;

if said identified oldest cache buffer has been used during said N predetermined time intervals, selecting the next oldest cache buffer and repeating said steps of locating and checking until the oldest cache buffer which has not been referenced by said host computer system during said N predetermined time intervals is located; and providing said identified oldest one of said plurality of cache buffers for receipt of new data read from said mass storage system by said host computer system.

2. The method of claim 1 wherein the step of maintaining said cache buffer history table comprises:

providing a plurality of memory bitmaps, wherein each said memory array comprises a plurality of bits each bit of said plurality of bits corresponding to a one of said plurality of cache buffers one of said plurality of memory bitmaps being designated as the current present memory bitmap indicative of cache buffer activity during said present one of said N predetermined time intervals;

in response to one or said plurality of cache buffers being referenced by said host computer system during said present one of said N predetermined time intervals, setting said bit in said present memory bitmap which corresponds to said one of said plurality of cache buffers being referenced;

in response to expiration of said present predetermined period of time, selecting another of said plurality of memory bitmaps as the new present memory bitmap; and in response to said step of selecting, resetting all bits in said new present memory bitmap.

3. The method of claim 2 wherein said step of determining comprises verifying that a bit in a present memory bit map corresponding to said referenced cache buffer is reset.

4. The method of claim 2 wherein said step of locating further comprises:

setting a pointer to point to the oldest entry in said circular list;

extracting information from said oldest entry in said circular list pointed to by said pointer, the extracted information identifying one of said plurality of cache buffers corresponding to said oldest entry in said circular list;

determining whether any bit, corresponding to the identified one of said plurality of cache buffers, in any of said plurality of memory bit maps is set; and in response to said determination that said any bit is set, setting said pointer to point to the next oldest entry in said circular list and repeating said last recited steps of extracting, determining and setting.

5. The method of claim 1 wherein said cache buffer management subsystem includes a memory which comprises a fast portion which may be more rapidly accessed than a remaining slow portion, wherein said circular list comprises a plurality of sections, wherein a section of said circular list containing the oldest entries and a section of said circular list containing the most recent entries reside in said fast portion of said memory.

6. In a mass storage subsystem having a controller connectable to a host computer system, cache management apparatus for managing a plurality of cache buffers using a two-level cache buffer management apparatus comprising:

a memory located in said controller;

at least one memory bitmap of a cache history table stored in said memory, each said memory bitmap having one bit corresponding to each of said plurality of cache buffers;

a circular list having a plurality of entries stored in said memory wherein each of the entries includes information identifying one of said plurality of cache buffers which was referenced by a host computer system during a predetermined period of time, the entries of said circular list being ordered chronologically from most recently referenced to least recently referenced;

first means located in said controller, responsive to any one of said plurality of cache buffers being referenced by a host computer during said predetermined period of time, for determining that said cache buffer has not been previously referenced during said predetermined period of time by inspecting said corresponding bit in said memory bitmap;

means located in said controller, responsive to a determination that said referenced cache buffer has not been previously referenced during said predetermined period of time, for setting said corresponding bit in said memory bitmap;

means located in said controller, responsive to a determination that said referenced cache buffer has not been previously referenced during said predetermined period of time, for adding an entry containing information identifying the referenced cache buffer, to said circular list;

second means located in said controller for determining whether said predetermined period of time T has ended;

means located in said controller, responsive to said determination that said predetermined period of time T has ended, for clearing all bits of one of said memory bitmaps; and means located in said controller, responsive to a request to overwrite any one of said plurality of cache buffers, for locating the oldest track reference entry in said circular list which identifies a cache buffer not referenced during predetermined period of time T.

7. The system of claim 6 wherein said at least one memory bitmap comprises a plurality of memory bitmaps, each of which corresponds to a one of a plurality of predetermined last occurring time intervals, wherein one of said plurality of memory bitmaps is designated as the present bitmap, corresponding to the present time interval and wherein said means for setting are operable to set bits in the current bitmap, said cache management apparatus further comprises:

means located in said controller, responsive to expiration of said present predetermined time interval, for selecting another of said plurality of memory bitmaps as the new present bitmap; and wherein said means for clearing all bits is responsive to said means for selecting to reset all bits in said new present bitmap.

8. The system of claim 8 wherein said first means for determining comprises means for verifying that said bit corresponding to said one of said plurality of cache buffers is reset in each of said plurality of memory bitmaps.

9. The system of claim 7 wherein said means for locating further comprises:

means for setting a pointer to point to the oldest entry in said circular list;

means for extracting information from the oldest entry pointed to by said pointer in said circular list, the extracted information identifying one of said plurality of cache buffers corresponding to said oldest entry in said circular list;

means for determining whether a bit is set corresponding to said one of said plurality of cache buffers identified by said extracted information in any of said plurality of memory bitmaps; and means, responsive to a determination that no bit is set, for setting said pointer to point at the next oldest entry in said circular list.

10. The system of claim 6 wherein said memory includes a fast portion which may be more rapidly accessed than a remaining slow portion, wherein said circular list comprises a plurality of sections, wherein a section of said circular list containing the oldest entries and a section of said circular list containing the most recent entries resides in said fast portion of said memory.

* * * * *